(12) United States Patent
Chen

(10) Patent No.: US 7,757,819 B2
(45) Date of Patent: Jul. 20, 2010

(54) BRAKING DEVICE FOR CHILD SEAT

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 1010 days.

(21) Appl. No.: 11/503,124

(22) Filed: Aug. 14, 2006

(65) Prior Publication Data

US 2007/0170015 A1  Jul. 26, 2007

(30) Foreign Application Priority Data

Jan. 20, 2006  (CN) .................. 2006 2 0002928 U

(51) Int. Cl.
*B62B 9/08* (2006.01)
(52) U.S. Cl. .................. 188/20; 188/1.12; 280/642; 280/647
(58) Field of Classification Search .................. 188/20, 188/1.12; 280/642, 647
See application file for complete search history.

(56) References Cited

U.S. PATENT DOCUMENTS

| | | | | |
|---|---|---|---|---|
| 482,708 A | * | 9/1892 | Watkins | 188/20 |
| 5,460,399 A | * | 10/1995 | Baechler et al. | 280/650 |
| 6,341,672 B1 | * | 1/2002 | Yang et al. | 188/20 |
| 6,408,990 B1 | * | 6/2002 | Chen | 188/20 |
| 6,742,791 B2 | * | 6/2004 | Lan | 280/62 |
| 6,827,365 B2 | * | 12/2004 | Yeh | 280/642 |
| 2006/0267302 A1 | * | 11/2006 | Liao | 280/47.34 |

FOREIGN PATENT DOCUMENTS

EP  0858940 A1 * 2/1998

* cited by examiner

*Primary Examiner*—Bradley T King
*Assistant Examiner*—James K Hsiao
(74) *Attorney, Agent, or Firm*—Bacon & Thomas, PLLC

(57) ABSTRACT

A braking device for a child seat is provided. The braking device comprises a first and second braking rods (20*a*, 20*b*), first and second braking pins (30*a*, 30*b*) and a braking pedal mechanism (40), the braking device being provided in a connecting tube (11) between two rear wheels (10*a*, 10*b*). When the brake pedal mechanism (40) rotates with respect to the connecting tube (11) in a direction, the braking rods (20*a*, 20*b*) move outward such that the outer ends (22*a*, 22*b*) of the braking rods (20*a*, 20*b*) are engaged with the rear wheels (10*a*, 10*b*) respectively, thereby completing the locking of the rear wheels (10*a*, 10*b*), and when the brake pedal mechanism (40) rotates with respect to the connecting tube (11) in another direction, the braking rods (20*a*, 20*b*) move inward such that the outer ends (22*a*, 22*b*) of the braking rods (20*a*, 20*b*) are disengaged from the rear wheels (10*a*, 10*b*) respectively, thereby completing the releasing of the rear wheels (10*a*, 10*b*).

8 Claims, 8 Drawing Sheets

BRAKING DEVICE FOR CHILD SEAT

BACKGROUND OF THE INVENTION

1. Field of the Invention

The present invention relates to a braking device, and more particularly, to a braking device for a child seat.

2. Description of Related Arts

In prior arts, many braking devices for strollers and high chairs are known. Due to the complex configuration of such braking devices, they arise to the inconvenient operation and frequent failure of the braking devices.

For example, U.S. Pat. No. 6,341,672 discloses a braking device for a stroller comprising a pair of braking wheels, a pair of braking rods, a rotary cam member and a pedal. The pedal of the braking device is designed to be complicatedly incorporated with a stationary housing, a rolling disk and a gripping arm.

SUMMARY OF THE INVENTION

Accordingly, it is an object of the present invention to provide a braking device for a child seat that overcomes the problem with the aforementioned prior art.

In accordance with an aspect of the present invention, a braking device for a child seat is provided, the braking device being provided in a connecting tube between two rear wheels for locking/releasing the rear wheels, the braking device comprising: first and second braking rods provided in the right and left sections of the connecting tube respectively; first and second braking pins, the first braking pin being attached to the first braking rod, and the second braking pin being attached to the second braking rod; and a braking pedal mechanism having an upper cover and a lower cover, the braking pedal mechanism being pivotally attached to the connecting tube, the inner side of each of the upper cover and the lower cover having first and second spiral grooves such that both ends of the first braking pin are slidably received in the first spiral groove of the upper cover and the first spiral groove of the lower cover, and both ends of the second braking pin are slidably received in the second spiral groove of the upper cover and the second spiral groove of the lower cover.

The first and second braking rods include an outer end away from each other, respectively, and when the brake pedal mechanism rotates with respect to the connecting tube in a direction, the braking rods move outward such that the outer ends of the braking rods are engaged with the rear wheels respectively, thereby completing the locking of the rear wheels, and when the brake pedal mechanism rotates with respect to the connecting tube in another direction, the braking rods move inward such that the outer ends of the braking rods are disengaged from the rear wheels respectively, thereby completing the releasing of the rear wheels.

The first and second braking rods include an inner end near to each other, respectively, the first braking pin is vertically attached to the inner end of the first braking rod, and the second braking pin is vertically attached to the inner end of the second braking rod.

The connecting tube is provided with openings such that both ends of the first and second braking pins protrude out of the openings of the connecting tube, respectively, and the braking pins are movable in the openings.

The upper cover is composed of a face cover and a middle cover, the spiral grooves of the upper cover are provided on the middle cover, and the inner side of the middle cover and the inner side of the lower cover can engage with each other and surround the connecting tube.

With respect to a direction vertical to the lengthwise direction of the connecting tube, the first and second spiral grooves of the upper cover are obliquely symmetric about the direction, and the first and second spiral grooves of the lower cover are obliquely symmetric about the direction.

The rear wheels are provided with a plurality of locking holes, respectively, such that when braking the rear wheels, the braking rods are engaged with one of the locking holes, respectively.

The connecting tube includes a wheel axle therein for pivotally interconnecting the rear wheels.

In accordance with another aspect of the present invention, a braking device for a child seat is provided, the braking device being provided in a connecting tube between two rear wheels for locking/releasing the rear wheels, the braking device comprising: first and second braking rods provided in the right and left sections of the connecting tube respectively; first and second braking pins, the first braking pin being attached to the first braking rod, and the second braking pin being attached to the second braking rod; and a braking pedal mechanism pivotally mounted on the connecting tube having a pair of first and second grooves, the first and second grooves are obliquely symmetric around an axis perpendicular to a lengthwise axis of the connecting tube, wherein the first and second braking pins are guided along the grooves such that the first and second braking rods are selectively moved toward and away from each other.

BRIEF DESCRIPTION OF THE DRAWINGS

These and other features, aspects and advantages of the present invention will become more apparent from the following description, appended claims, and accompanying exemplary embodiments shown in the drawings, which are briefly described below.

DETAIL DESCRIPTION OF THE PREFERRED EMBODIMENT

A braking device for a child seat according to an embodiment of the present invention will be described below with reference to the drawings.

Figure 1:
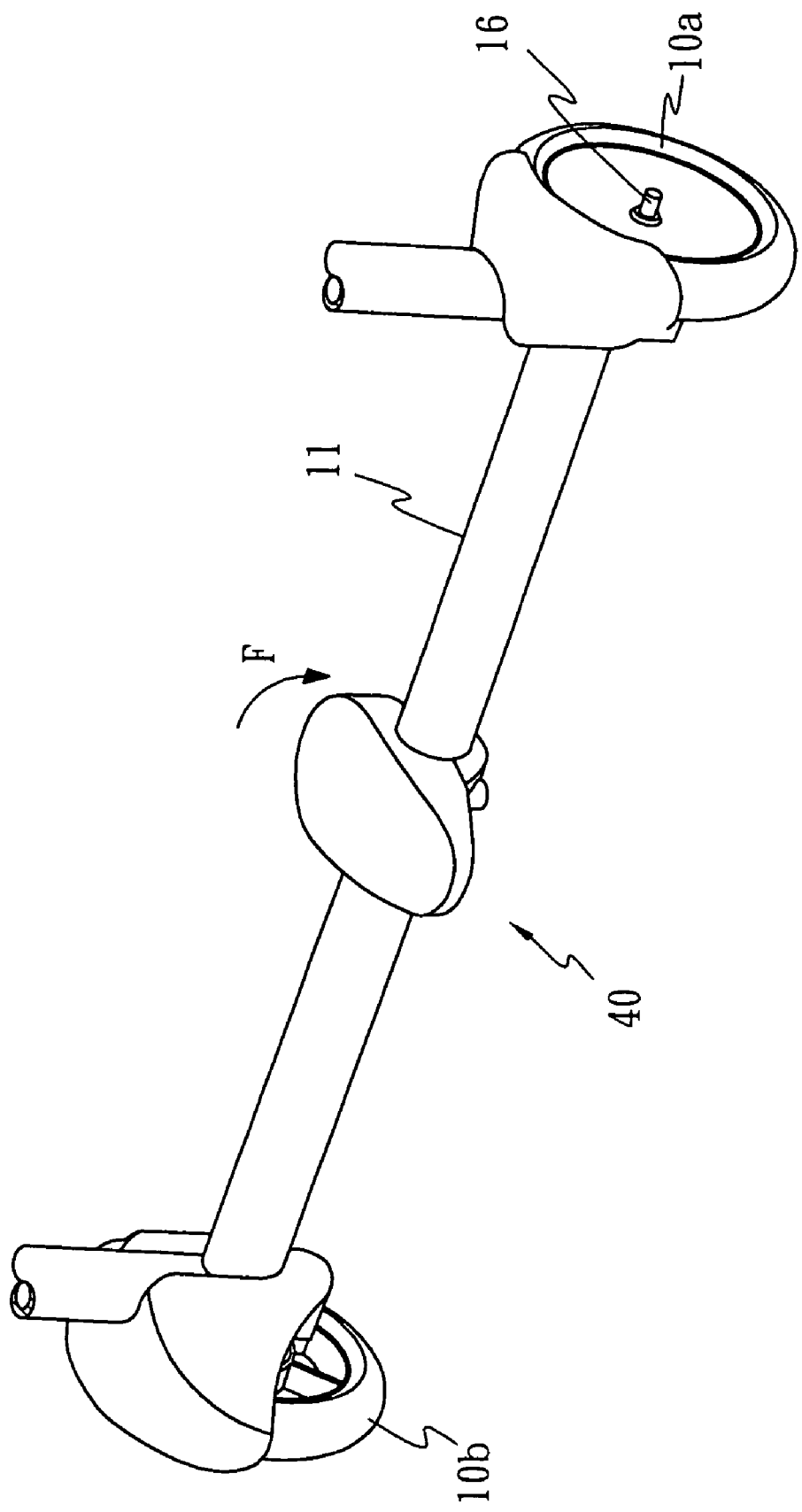
FIG. 1 is a perspective view of a braking device according to the present invention, provided in a connection tube between two rear wheels of a child seat.
Figure 2:
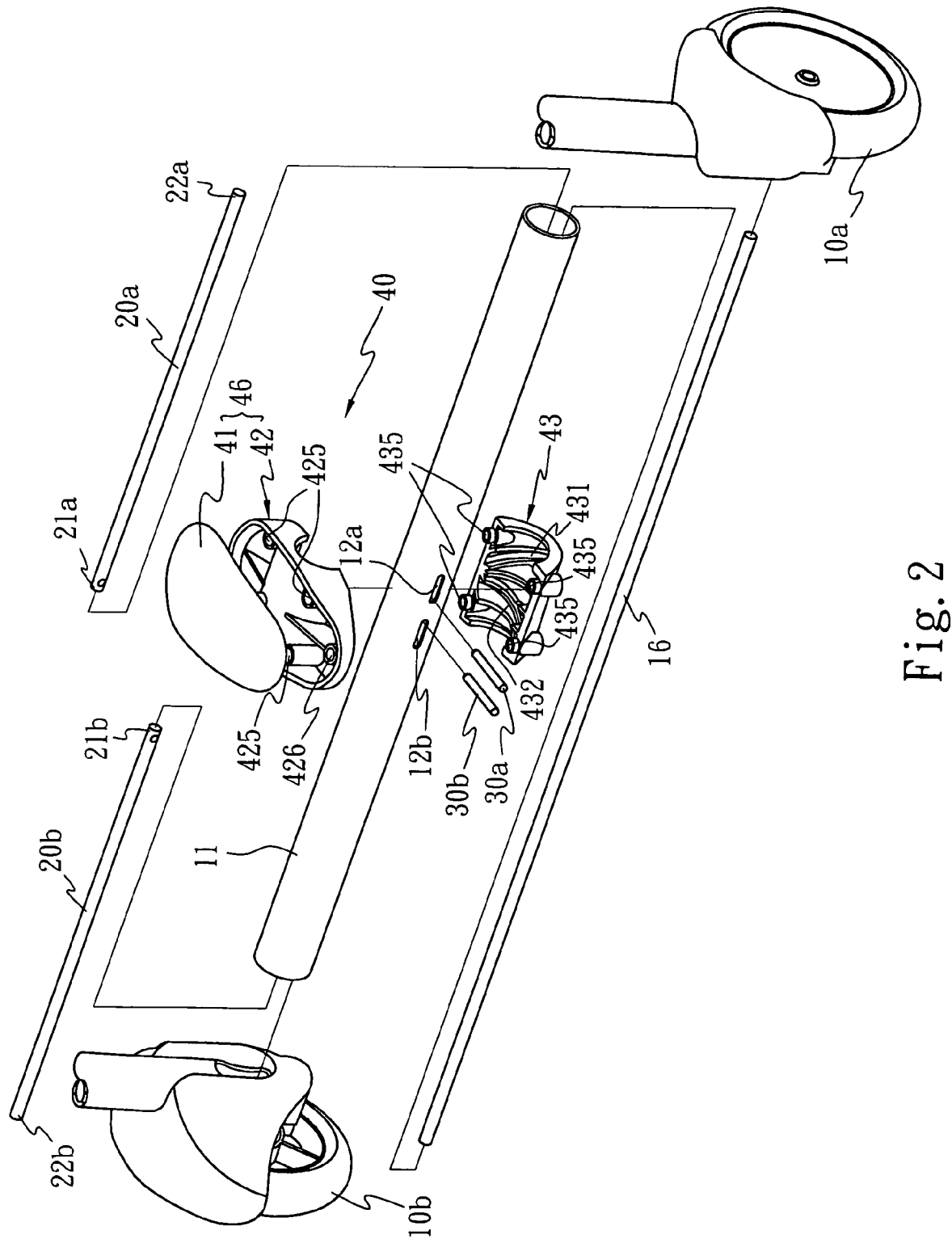
FIG. 2 is an exploded view of the braking device of FIG. 1.

FIG. 1 is a perspective view of a braking device according to the present invention, provided in a connection tube between two rear wheels of a child seat, and FIG. 2 is an exploded view of the braking device of FIG. 1.

Figure 8:
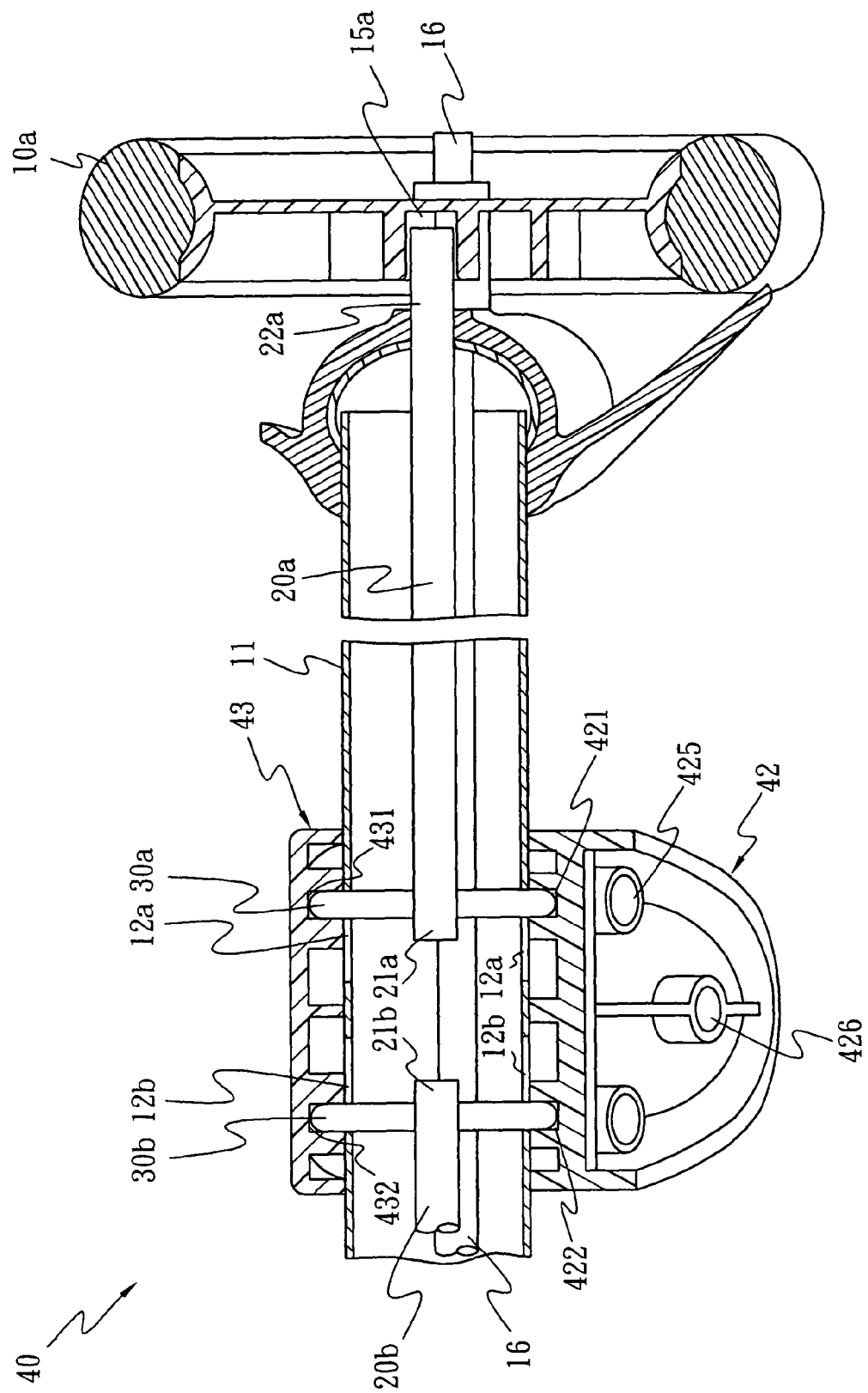
FIG. 8 is a partially sectional view of the braking device taken along line A-A in FIG. 7.

As shown in FIGS. 1, 2 and 8, the braking device according to the present invention is provided in a connecting tube 11 between two rear wheels 10a, 10b of a child seat. A wheel axle 16 is provided inside the connecting tube 11 so as to pivotally interconnect the rear wheels 10a, 10b. The braking device according to the present invention comprises first and second braking rods 20a, 20b, first and second braking pins 30a, 30b, and a braking pedal mechanism 40. The connection pipe 11 has a pair of symmetric opening 12a and a pair of symmetric opening 12b at positions near the center thereof. The rear wheels 10a, 10b have a plurality of locking holes 15a, 15b (not shown) around the center thereof, respectively.

The first and second braking rods 20a, 20b are provided in the right and left sections of the connecting tube 11 respectively and above the wheel axle 16 (see FIG. 3), and move restrainedly in the axial direction of the connecting tube 11. The braking rods 20a, 20b include inner ends 21a, 21b close to each other and outer ends 22a, 22b away from each other, respectively.

Figure 3:
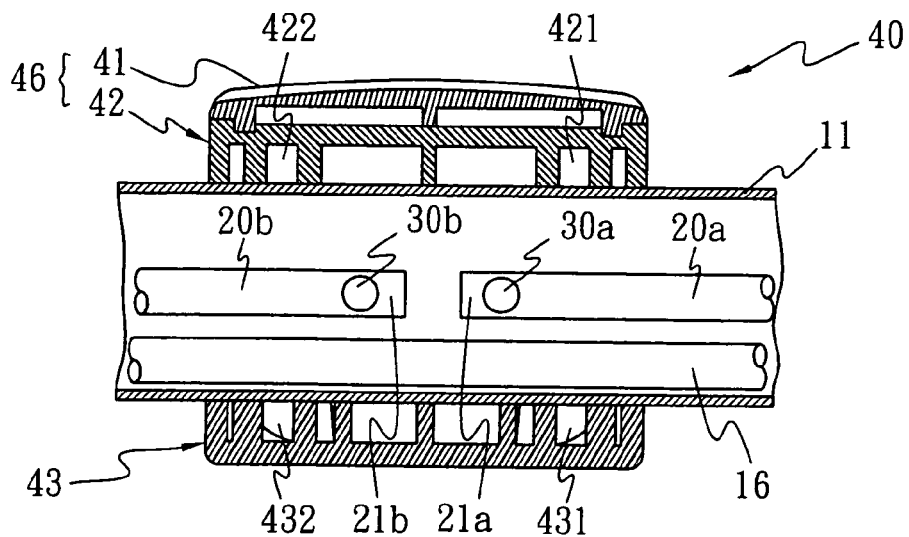
FIG. 3 is a partially sectional view of the braking device taken along line C-C in FIG. 9.
Figure 4:
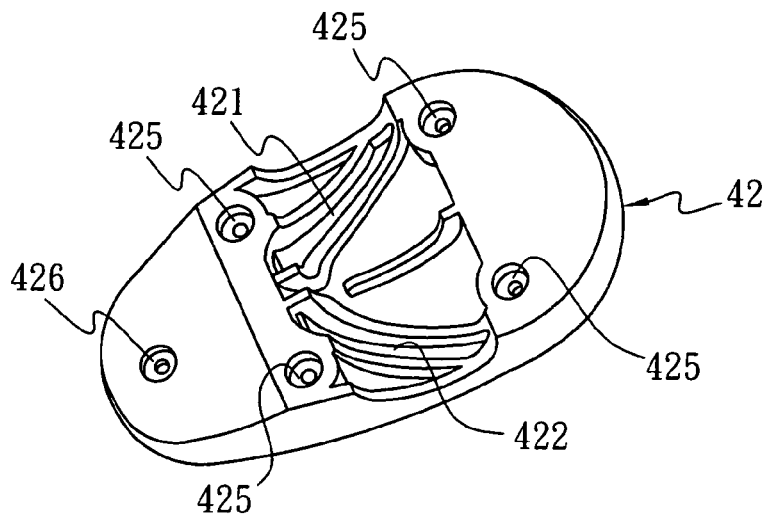
FIG. 4 is a perspective view showing a middle cover of a braking pedal mechanism of the braking device of FIG. 1.
Figure 5:
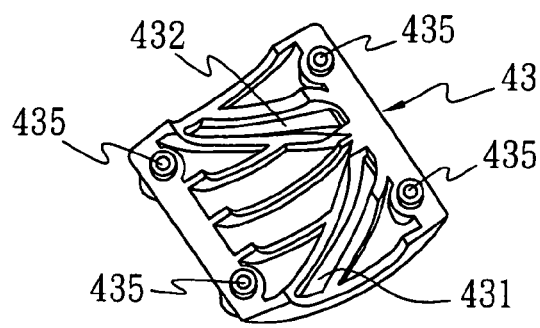
FIG. 5 is a perspective view showing a lower cover of the braking pedal mechanism of the braking device of FIG. 1.

As shown in FIG. 2, the braking pedal mechanism 40 includes an upper cover 46 and a lower cover 43, and the upper cover 46 is composed of a face cover 41 and a middle cover 42. Fasteners such as screws (not shown) are used to penetrate through fastening holes 425 of the middle cover 42 and corresponding fastening holes 435 of the lower cover 43 so that the inner side of the middle cover 42 and the inner side of the lower cover 43 are connected to each other, and surrounded and pivoted on the connecting tube 11. The face cover 41 is fastened to the outer side of the middle cover 42 by screwing fasteners such as screws (not shown) into the face cover 41 through the fastening holes 426 of the middle cover 42. As shown in FIGS. 3 and 4, the middle cover 42 includes a pair of first and second spiral grooves 421, 422, which are obliquely symmetric to each other with respect to a direction vertical to the lengthwise direction of the connecting tube 11. As shown in FIG. 5, the lower cover 43 includes a pair of first and second spiral grooves 431, 432, which correspond to the first and second spiral grooves 421, 422 of the middle cover 42.

As shown in FIG. 8, the first braking pin 30a is vertically attached to the inner end 21a of the first braking rod 20a at the middle position thereof, and the second braking pin 30b is vertically attached to the inner end 21b of the second braking rod 20b at the middle position thereof. Both ends of the first braking pin 30a protrudes out of the openings 12a of the connecting tube 11, and both ends of the second braking pin 30b protrudes out of the openings 12b of the connecting tube 11.

When assembling the braking pedal mechanism 40, the first braking pin 30a penetrates through the openings 12a with the two ends thereof being slidably received in the first spiral groove 421 of the middle cover 42 and the first spiral groove 431 of the lower cover 43, and the second braking pin 30b penetrates through the openings 12b with the two ends thereof being slidably received in the second spiral groove 422 of the middle cover 42 and the second spiral groove 432 of the lower cover 43, so that the braking pedal mechanism 40 rotatably pivots on the connecting tube 11. The first spiral groove 421 of the middle cover 42 and the first spiral groove 431 of the lower cover 43 are symmetric with respect to the central axis of the connecting tube 11, and the second spiral groove 422 of the middle cover 42 and the second spiral groove 432 of the lower cover 43 are symmetric with respect to the central axis of the connecting tube 11, so that the first braking pin 30a and the second braking pin 30b can move along the openings 12a, 12b of the connecting tube 11, respectively. In the present embodiment, the openings 12a, 12b of the connecting tube 11 are configured in the form of an elongate slot, so that when both ends of the first braking pin 30a and both ends of the second braking pin 30b move in the fist spiral grooves 421, 431 and the second spiral grooves 422, 432, respectively, the braking pins 30a, 30b can move in a direction parallel to the wheel axle 16, while the braking rods 20a, 20b attached to the braking pins 30a, 30b can also move in the direction parallel to the wheel axle 16, thereby achieving the locking/releasing of the braking device.

Figure 6:
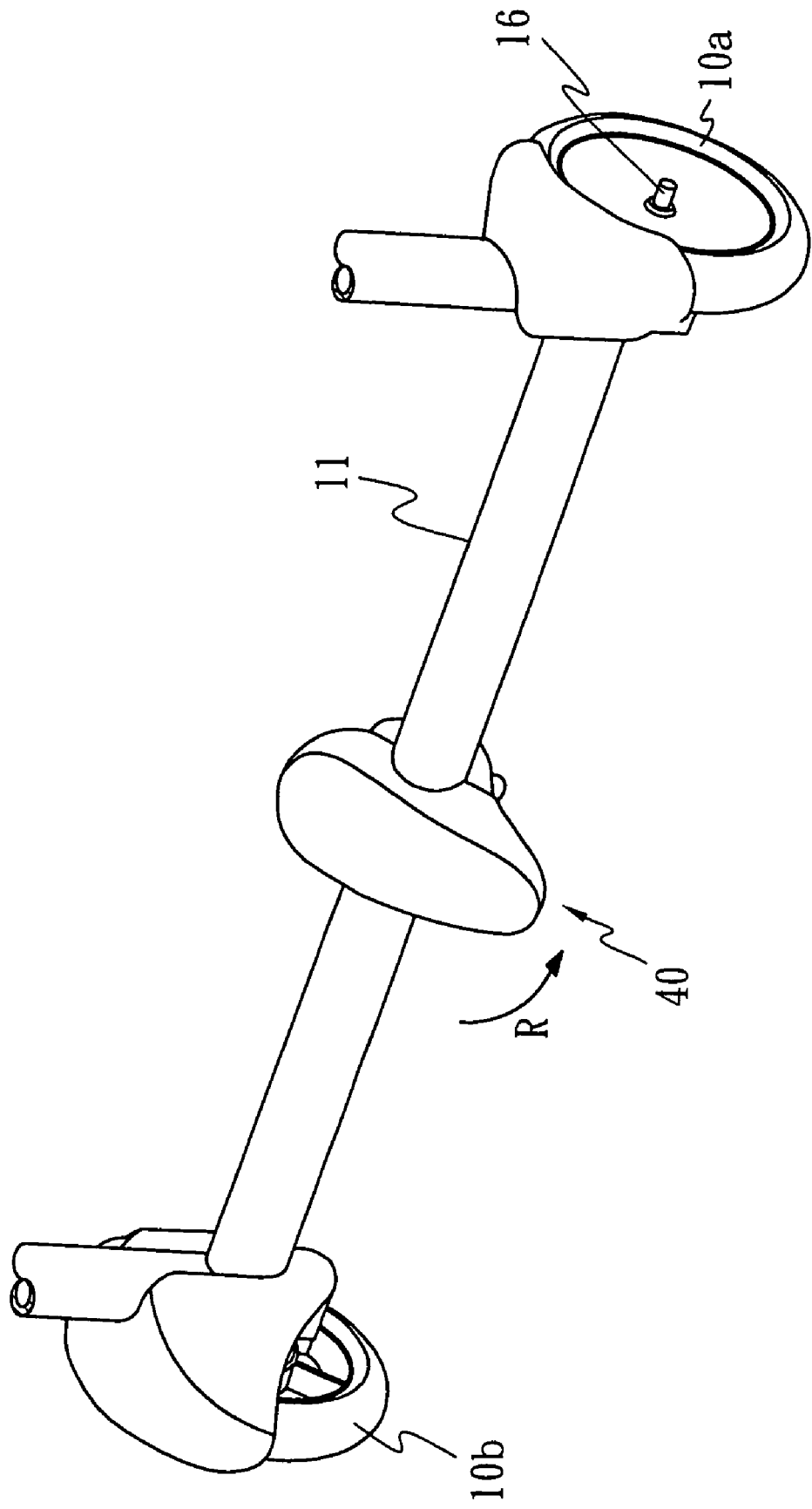
FIG. 6 is a perspective view of the braking device of FIG. 1 in a locking state.
Figure 7:
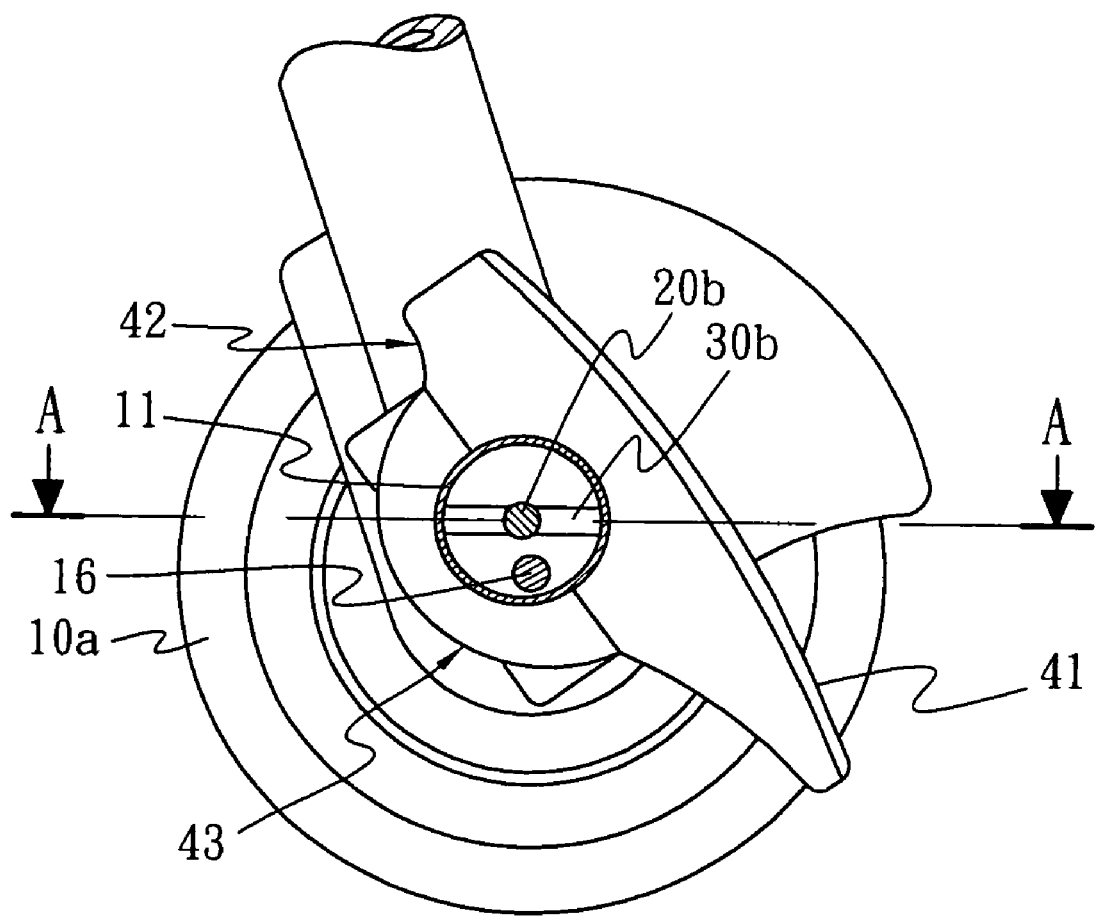
FIG. 7 is a side view of the braking device in a locking state.

According to the braking device of the present invention, as shown in FIGS. 6, 7 and 8, when a user desires to brake the rear wheels 10a, 10b, the user steps backward on the brake pedal mechanism 40 to make the brake pedal mechanism 40 rotate with respect to the connecting tube 11 in the direction R indicated in FIG. 6, so that both ends of the first braking pin 30a move towards the right rear wheel 10a (right in FIG. 8) along the first spiral groove 421 of the middle cover 42 and the first spiral groove 431 of the lower cover 43 (that is, moving from one end near the inner side of the braking pedal mechanism 40, of the spiral grooves 421, 431 to the other end near the outside thereof, of the spiral grooves 421, 431), and both ends of the second braking pin 30b move towards the left rear wheel 10b (left in FIG. 8) along the second spiral groove 422 of the middle cover 42 and the second spiral groove 432 of the lower cover 43 (that is, moving from one end near the inner side of the braking pedal mechanism 40, of the spiral grooves 422, 432 to the other end near the outside thereof, of the spiral grooves 422, 432). At the same time, the first and second braking rods 20a, 20b also move towards the right and left rear wheels 10a, 10b, respectively, so that the outer end 22a of the first braking rod 20a and the outer end 22b of the second braking rod 20b are inserted into one of the locking holes 15a provided in the right rear wheel 10a and one of the locking holes 15b provided in the right rear wheel 10b, respectively, thereby completing the locking operation of the braking device.

Figure 9:
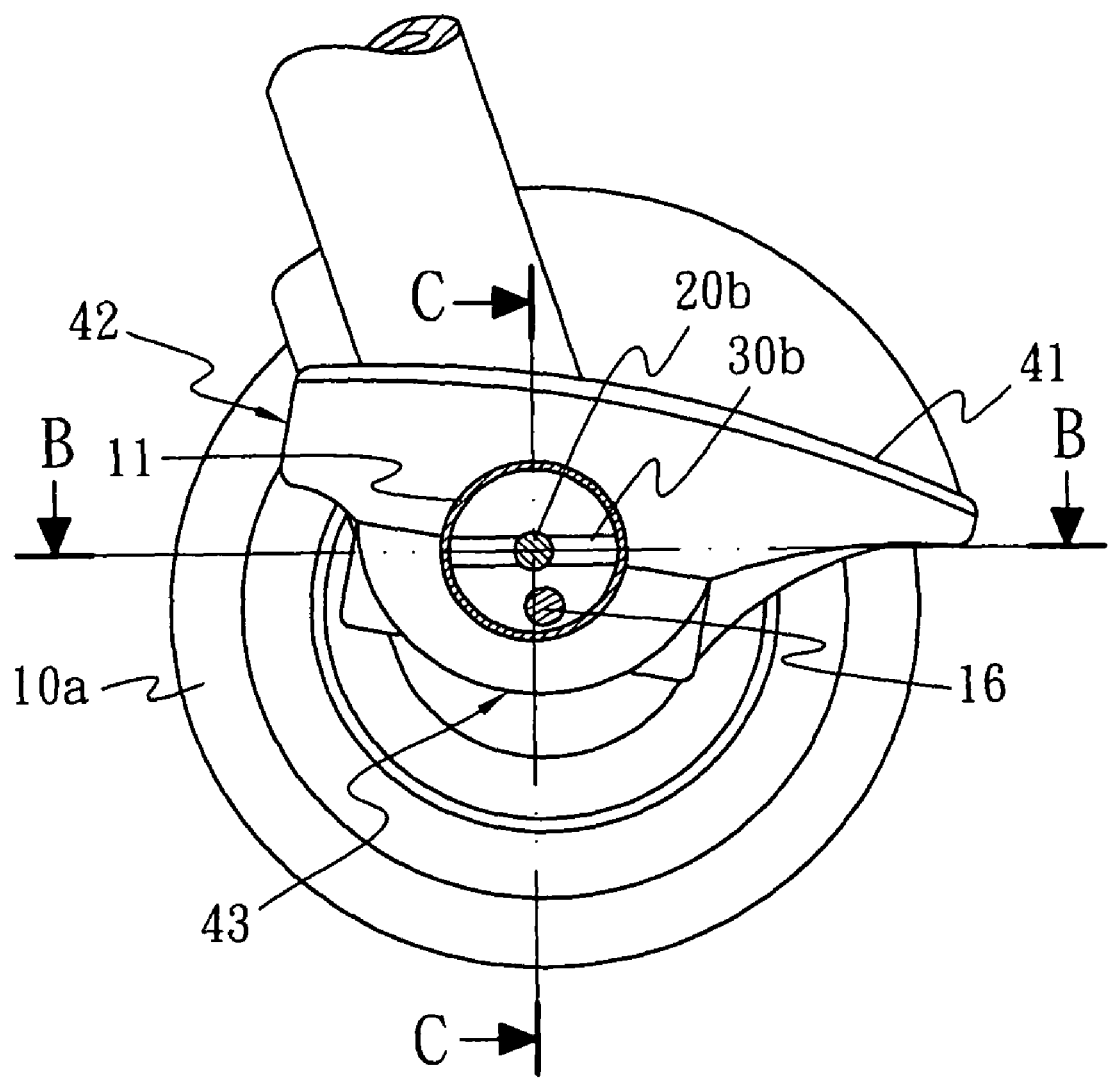
FIG. 9 is a side view of the braking device in a releasing state.
Figure 10:
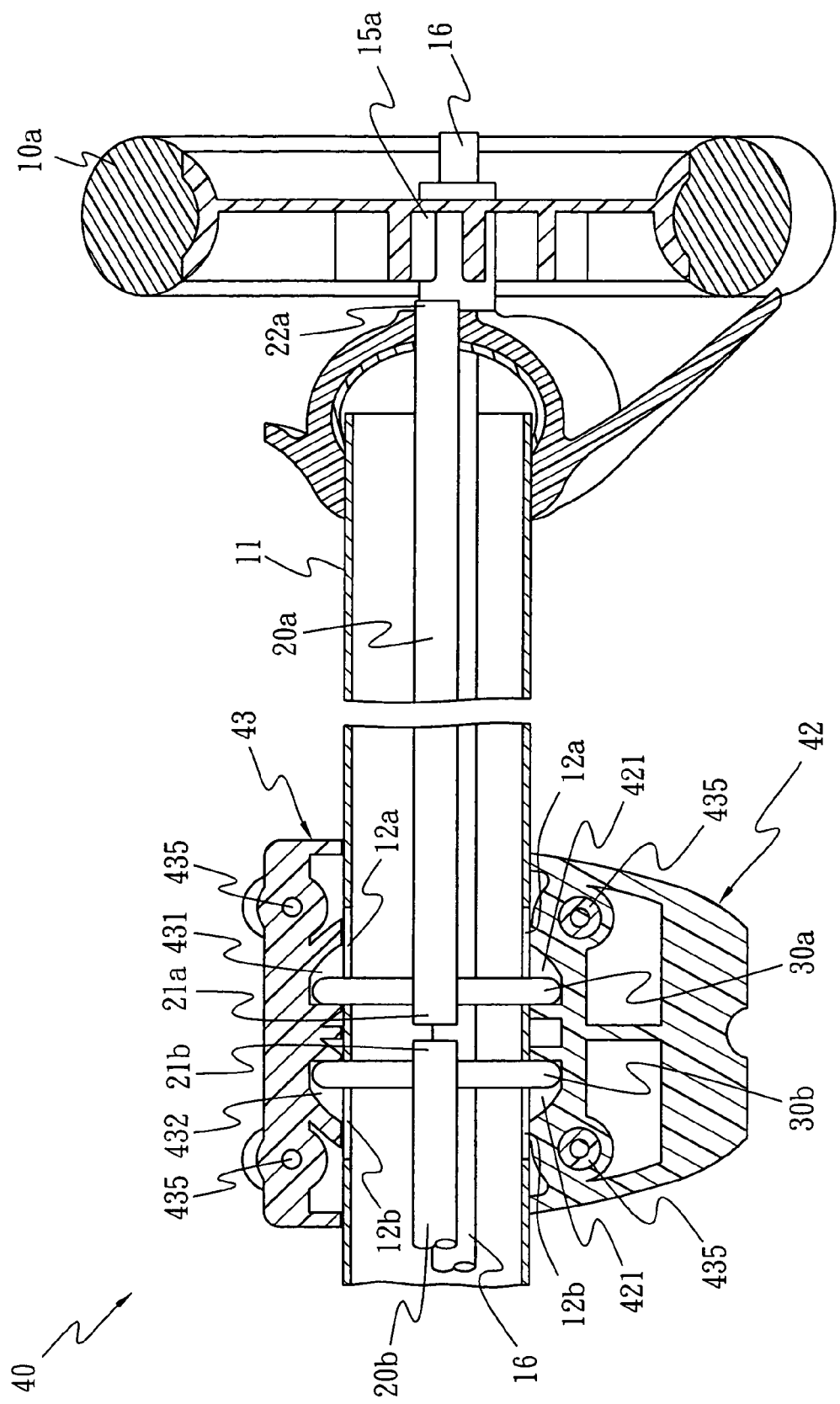
FIG. 10 is a partially sectional view of the braking device taken along line B-B in FIG. 9.

As shown in FIGS. 9 and 10, when the user desires to release the rear wheels 10a, 10b, the user steps forward on the brake pedal mechanism 40 to make the brake pedal mechanism 40 rotate with respect to the connecting tube 11 in the direction F indicated in FIG. 1, so that the first and second braking pins 30a, 30b move towards the middle of the connecting tube 11. At the same time, the first and second braking rods 20a, 20b also move towards the middle of the connecting tube 11, so that the outer end 22a of the first braking rod 20a and the outer end 22b of the second braking rod 20b are drawn out of the locking hole 15a provided in the right rear wheel 10a and the locking hole 15b provided in the right rear wheel 10b, respectively, thereby completing the releasing operation of the braking device.

Given the disclosure of the present invention, one skilled in the art would appreciate that there may be other embodiments and modifications within the scope of spirit of the present invention. Accordingly, all modifications attained by one skilled in the art from the present disclosure within the scope and spirits of the present invention are to be included as further embodiments of the present invention. The scope of the present invention accordingly is to be defined as set forth in the appended claims.

What is claimed is:

1. A braking device for a child seat, the braking device being provided in a connecting tube between two rear wheels for locking/releasing the rear wheels, the braking device comprising:

first and second braking rods provided in the right and left sections of the connecting tube respectively;

first and second braking pins, the first braking pin being attached to the first braking rod, and the second braking pin being attached to the second braking rod; and a braking pedal mechanism having an upper cover and a lower cover, the braking pedal mechanism being pivotally attached to the connecting tube, an inner side of the upper cover and an inner side of the lower cover each have first and second spiral grooves such that first and second ends of the first braking pin are slidably received respectively in the first spiral groove of the upper cover and the first spiral groove of the lower cover, and first and second ends of the second braking pin are slidably received respectively in the second spiral groove of the upper cover and the second spiral groove of the lower cover.

2. A braking device for a child seat according to claim 1, wherein the first and second braking rods include an outer end away from each other, respectively, and when the brake pedal mechanism rotates with respect to the connecting tube in a direction, the braking rods move outward such that the outer ends of the braking rods are engaged with the rear wheels respectively, thereby completing the locking of the rear wheels, and when the brake pedal mechanism rotates with respect to the connecting tube in another direction, the braking rods move inward such that the outer ends of the braking rods are disengaged from the rear wheels respectively, thereby completing the releasing of the rear wheels.

3. A braking device for a child seat according to claim 2, wherein the first and second braking rods each include an inner end near to each other, the first braking pin is vertically attached to the inner end of the first braking rod, and the second braking pin is vertically attached to the inner end of the second braking rod.

4. A braking device for a child seat according to claim 1, wherein the connecting tube is provided with openings such that both ends of the first and second braking pins protrude out of the openings of the connecting tube, respectively, and the braking pins are movable in the openings.

5. A braking device for a child seat according to claim 1, wherein the upper cover is composed of a face cover and a middle cover, the spiral grooves of the upper cover are provided on the middle cover, and the inner side of the middle cover and the inner side of the lower cover can engage with each other and surround the connecting tube.

6. A braking device for a child seat according to claim for 4, wherein with respect to a direction vertical to the lengthwise direction of the connecting tube, the first and second spiral grooves of the upper cover are obliquely symmetric about the direction, and the first and second spiral grooves of the lower cover are obliquely symmetric about the direction.

7. A braking device for a child seat according to claim 2, wherein the rear wheels are provided with a plurality of locking holes, respectively, such that when braking the rear wheels, the braking rods are engaged with one of the locking holes, respectively.

8. A braking device for a child seat according to claim 1, wherein the connecting tube includes a wheel axle therein for pivotally interconnecting the rear wheels.

* * * * *